Figure 1:
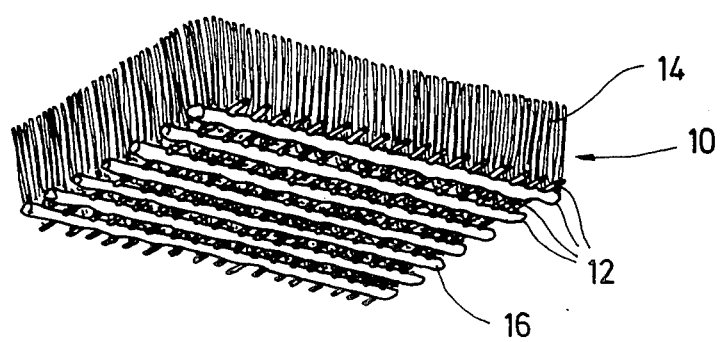

United States Patent [19]

Friedrich

[11] Patent Number: 4,477,299
[45] Date of Patent: Oct. 16, 1984

[54] METHOD OF BONDING A FLOOR-COVERING WEB WITH A BACKING WEB

[75] Inventor: Hans-Joachim Friedrich, Auenwald, Fed. Rep. of Germany

[73] Assignee: J. F. Adolff AG, Backnang, Fed. Rep. of Germany

[21] Appl. No.: 355,496

[22] Filed: Mar. 8, 1982

[30] Foreign Application Priority Data

Apr. 4, 1981 [DE] Fed. Rep. of Germany ....... 3113636

[51] Int. Cl.³ .......................... B32B 31/08; C09J 5/06
[52] U.S. Cl. ...................................... 156/72; 156/271; 156/273.3; 156/309.9; 156/320; 156/379.8; 156/380.9
[58] Field of Search ................... 156/320, 273.3, 379.8, 156/380.9, 72, 82, 309.9, 271

[56] References Cited

U.S. PATENT DOCUMENTS

| | | | |
|---|---|---|---|
| 2,293,568 | 8/1942 | Snyder | 156/309.9 |
| 3,660,190 | 5/1972 | Stroszynski | 156/273.3 |
| 3,661,691 | 5/1972 | Slosberg | 156/72 |
| 3,669,779 | 6/1972 | Gordon | 156/72 |
| 3,728,182 | 4/1973 | Wisotzky et al. | 156/72 |
| 4,059,465 | 11/1977 | Edgar et al. | 156/72 |
| 4,090,902 | 5/1978 | Ferrentino et al. | 156/273.3 |
| 4,171,395 | 10/1979 | Tillotson | 428/95 |

FOREIGN PATENT DOCUMENTS

| | | |
|---|---|---|
| 1600936 | 9/1970 | France . |
| 9288/62 | 3/1968 | Switzerland . |
| 971958 | 10/1964 | United Kingdom . |

Primary Examiner—Michael Wityshyn
Attorney, Agent, or Firm—Neuman, Williams, Anderson & Olson

[57] ABSTRACT

Method of bonding a floor-covering web consisting of a pile material coated on its back at least partially with a thermoplastic substance, with a backing web, the upper side of said backing web being formed at least partially by a thermoplastic substance and wherein the pile material and the backing web are moved synchronously and guided such that they run towards each other before being bonded, the underside of the floor-covering web and the upper side of the backing web thereby facing at least one heat source, that the coating on the back of the floor-covering web and the other side of the backing web are at least partially plastified by heating and wherein the heated sides of the pile material and the backing web are placed against each other and the webs bonded together.

10 Claims, 6 Drawing Figures

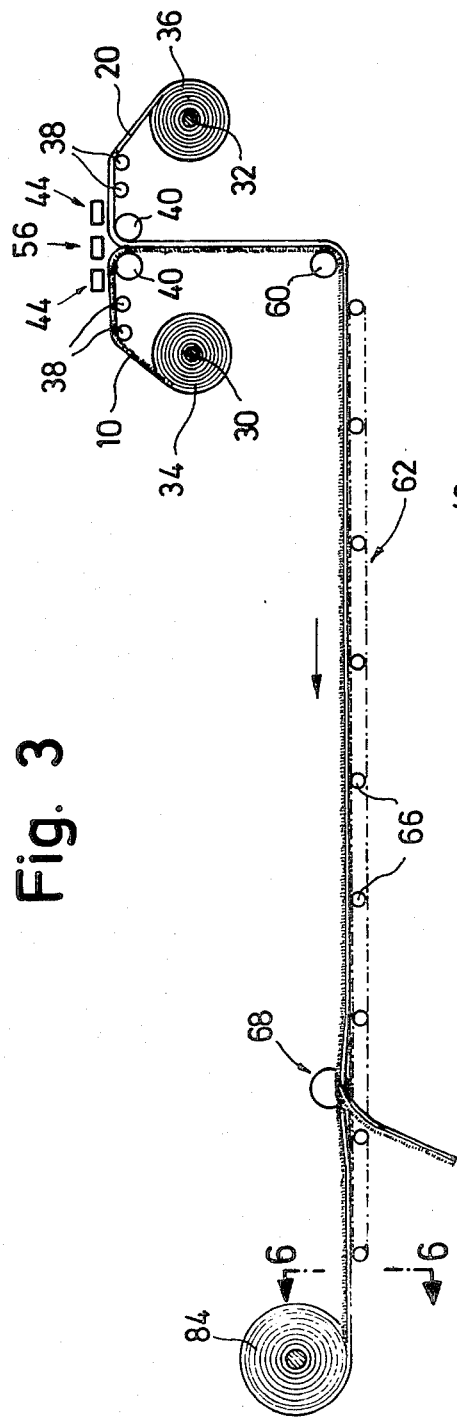
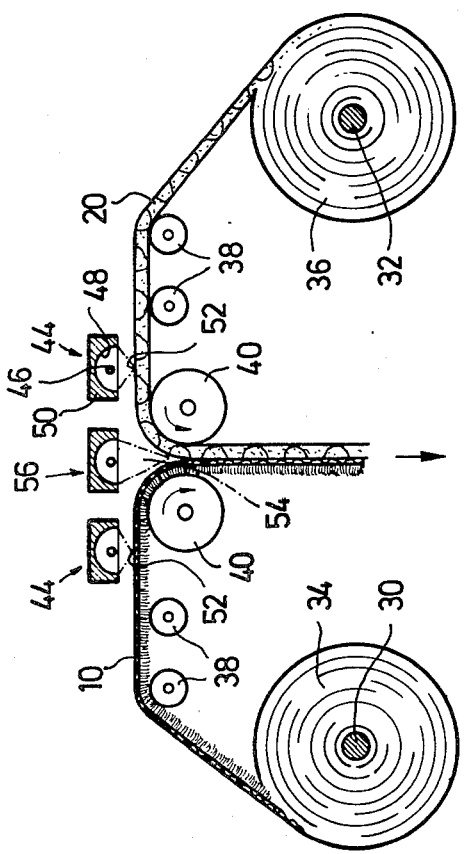
Fig. 3
Fig. 4

METHOD OF BONDING A FLOOR-COVERING WEB WITH A BACKING WEB

The invention relates to a method of bonding a floor-covering web consisting of a pile material coated on its back at least partially with a thermoplastic substance, with a backing web, the upper side of said backing web being formed at least partially by a thermoplastic substance. The invention relates in particular to such a method of producing so-called artificial lawns for sports fields.

Such artificial lawns are already offered in the market, where the upper web, when installed for use, is provided with a basic substrate to which the pile threads or pile ribbons resp. are secured and which is coated on its back entirely or partially with a thermoplastic substance, e.g. soft PVC, which serves, among other objects, for improving the locking of the pile threads in the substrate. The lower web, when installed for use, is an elastic closed or perforated mat consisting of a core of woven or knitted fabric or the like, coated, e.g., with soft PVC. Both webs are permanently bonded together.

It is the object of the invention to provide a simple method for bonding the two webs already before bedding the floor covering, which can be carried out continuously and renders it possible to economically and permanently bond larger batches of the two webs, which may, e.g., be available in rolled up state.

This problem can be solved in line with the invention by synchronously moving the two webs in longitudinal direction and guiding them such that they run towards each other before being bonded, the underside of the floor-covering web and the upper side of the backing web thereby facing at least one heat source, by plastifying the coating on the back of the floor-covering web and the upper side, when installed for use, of the backing web at least partially by heating, and by placing the heated sides of the two webs against each other and bonding the two webs thereby together—this process could be called a hot-sealing process. When carrying out the inventive method it is not necessary to use an adhesive or to perform relatively complicated steps, such as sewing the two webs together; beyond this the inventive method achieves a bond, the character of which is extraordinarily easy to control, as the method can optionally be varied between a bonding over the entire surface and an only partial bonding; it would, e.g., be possible to heat the webs to be bonded only along strip-shape regions extending longitudinally to the webs and arranged at a transverse distance from each other, and the width and number of such heated string could be selected as desired—it would only be necessary to provide and arrange the heat sources respectively.

It is especially advantageous to use infra-red heaters for the heating operation, so that a preferable embodiment of the inventive method is characterized by the use of at least one infra-red heating as heat source.

In order to eliminate the danger of burning the thermoplastic substance, it is recommended to preheat the underside of the floor-covering web and the upper side of the backing web before bringing the two webs together and to plastify them immediately before they are placed against each other by directing the radiation of at least one infra-red heater into the funnel-shaped space formed by bringing together the webs. When proceeding such, it is not necessary to perform the heating at such high densities of energy as it would be required if the thermoplastic material of the two webs passing the apparatus would be heated at one single place from its cold to its softening state.

In order to obtain a product of special inherent stability, it is recommended to place the bonded webs, before rolling them up or handling them otherwise, on a conveyor belt to cool, preferably with the pile side directed upwardly, and in a preferred embodiment of the inventive method the two webs are subsequently cut to the required width, e.g., by severing with a knife marginal strips along one or both longitudinal edges of the bonded webs. It is also suggested to fix the longitudinal edges of the webs thus bonded on the conveyor belt, e.g., by providing on the conveyor belt two rows of nails or needles arranged at a transverse distance from each other, which would intrude into the two webs and thus prevent a shrinking of said webs in transverse direction during the cooling. As a rule, however, the product will be allowed to freely shrink.

As the application of the method according to the invention admits to abstain from using the adhesive and applying high contacting pressures for bonding the two webs together, the invention also opens up the possibility of producing an artificial lawn containing a plurality of small water tanks, which admit to "air-condition" to a certain degree sports fields in hot countries provided with such an artificial lawn. If a backing web is used consisting at least at its surface of a thermoplastic material and provided at its upper side with trough-like recesses, and if furthermore a water-permeable floor-covering web is used, a preferable embodiment of the inventive method provides to bond substantially only the margins of the trough-like recesses with the back coating of the floor-covering web, whereby the recesses are at least partially maintained. True, if such an artificial lawn is sprinked, the water passes through the upper web, but is partially retained by the trough-like recesses, so that the evaporating water will keep the surface of a sports field relatively cool.

Figure 2:
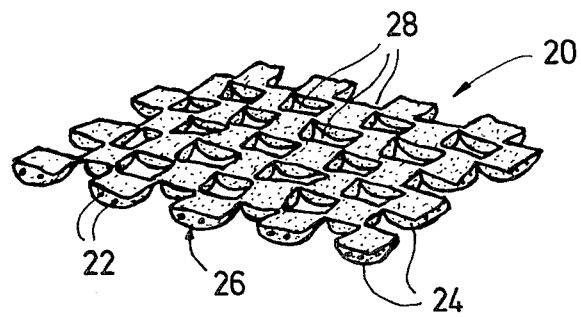
Figure 5:
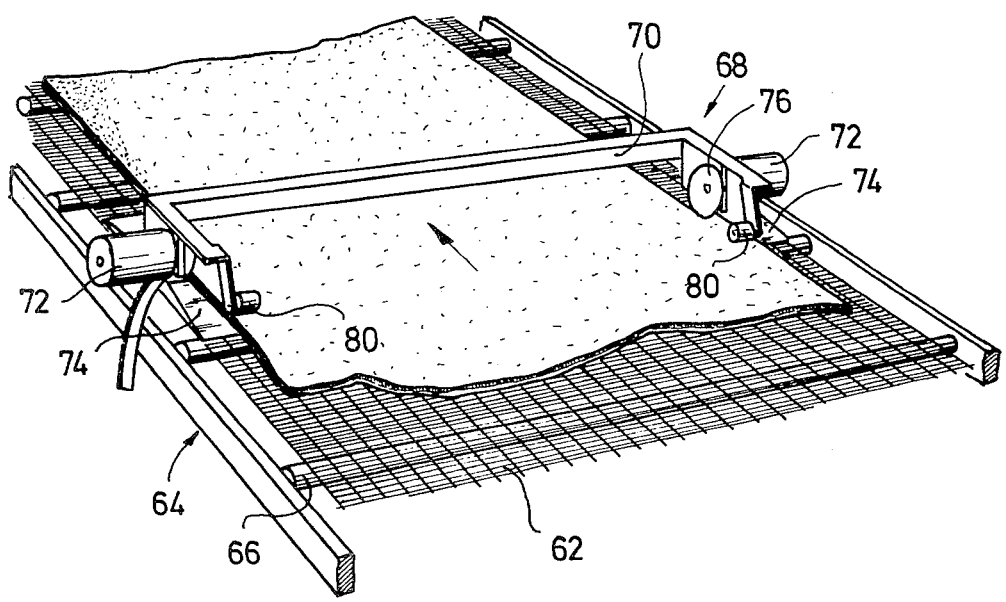
Figure 6:
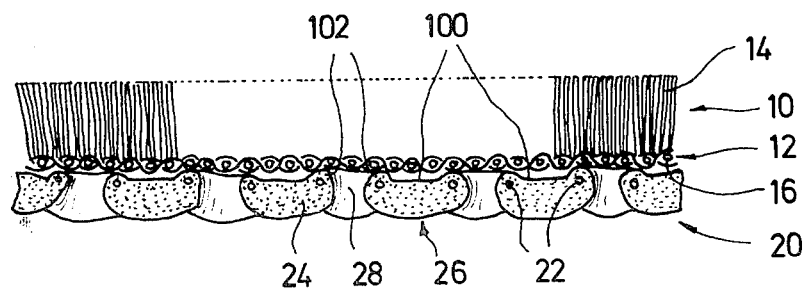

Further features, advantages and details of the invention will result from the following specification together with the attached drawings of a particularly advantageous embodiment of the inventive method and the final product achieved thereby. In the attached drawings:

FIG. 1 is a perspective view of a portion of a lawn web forming an artificial lawn, viewed diagonally from the bottom;

FIG. 2 a view of a portion of a backing web, viewed diagonally from above;

FIG. 3 an apparatus according to the invention for carrying out the inventive method in a highly simplified side view;

FIG. 4 the part of the apparatus, where the two webs are bonded together, at a somewhat larger scale and partly in section along a vertical plane;

FIG. 5 a view of part of the conveyor belt shown in FIG. 3, viewed diagonally from above, and FIG. 6 a section through the final product produced in line with the inventive method.

FIG. 1 shows a portion of a lawn web 10 which can be used as a floor-covering web, consisting substantially of a textile basic carrier 12 and pile ribbons 14 secured therein. The basis carrier 12 can, e.g., be a woven or knitted fabric of yarns of a plastic material, whereas the pile ribbons 14 are expediently produced of thermoplastic substances. The basis carrier 12 is coated at its underside with a so-called back-covering mass 16, which is only partially effected in the embodiment shown, in order to make the lawn web water-permeable.

The portion of a backing web 20 shown in FIG. 2 consists in the preferable embodiment of a woven or knitted fabric of core threads 22 and a coating mass 24 forming cushion-like burls 26 projecting downwardly and leaving apertures 28 free, so that also the backing web 20 is water-permeable.

Preferably the back-coating mass 16 and the coating mass 24 consist at least substantially of thermoplastic substances and in particular both of soft PVC.

The apparatus according to the invention shown in FIGS. 3 to 5 for carrying out an especially advantageous embodiment of the inventive method has two rotatably mounted carrier bars 30 and 32 for a roll of lawn web 34 and a roll of backing web 36, from which carrier bars the two webs are drawn off. At first each web passes supporting rollers 38 arranged in a horizontal plane, so that the paths of the webs are also horizontal, the two sides to be bonded together being directed upwardly. Thereupon the two webs are guided over two cooling rollers 40, which are, as the supply rollers 38, rotatably mounted, but driven in contrary sense and cooled by means not shown. They are arranged at such a distance from each other that the two webs will come into contact with the faces to be bonded under a slight pressure.

As it can best be recognized from FIG. 4, infra-red heaters 44 are arranged above the lawn web 10 and the backing web 20 before they pass the cooling rollers 40, which infra-red heaters 44 serve for preheating the back-covering mass 16 of the lawn web and the coating mass 24 of the backing web. They consist substantially of heating rod 46 and a housing 50 provided with a concave reflector 48, all of which extend over the entire width of the respective web 10 or 20 and are designed and arranged such that the focal line 52 of each of said infra-red heaters is situated in the plane of the underside of the lawn web 10 or the upper side of the backing web 20 resp.

When the two webs 10, 20 run around the cooling rollers 40 they form, before coming in contact, a funnel-shaped space 54 open towards above, and a further infra-red heater 56 is arranged above said funnel-shaped space 54. This latter infra-red heater is principally of the same design as the infra-red heaters 44, the focal length of its hollow reflector being, however, larger, so that the focal line 52 of this latter infra-red heater 56 is situated within said funnel-shaped space and preferably shortly before, or at, the place where the two webs come in contact for the first time.

In line with the invention the apparatus is constructed such that the speed of the two webs is within the range of 1 to 3 meters per minute, and that the temperatures below the infra-red heaters 44 and a short distance above the two webs amount to about 300° C. However, the temperature in the top region of the funnel-shaped space 54 and a short distance above the contacting line of the two webs only amounts to about 130° to 150° C.

At the feed rate of the two webs stated above the afore listed temperatures will suffice for bringing the PVC of the back-covering mass 16 and of the coating mass 24 at their surfaces at least into a pasty state so that, when the two webs are placed against each other by the cooling rollers 40, the webs are bonded or welded together due to the state of the PVC. In line with the invention the cooling rollers prevent an undesired deformation of the pile ribbons 14 of the web 10 and of the burls 26 of the backing web 20 during the heating process of the inventive method.

Leaving the cooling rollers 40, the webs pass a rotatably mounted deflecting roller 60 and subsequently they are deposited on a conveyor belt 62 formed of wire netting, the lawn web 10 being directed upwardly. Also the conveyor belt 62 is driven by means not shown in such a way that the webs between the cooling rollers 40 and the conveyor belt 62 remain at least substantially free from longitudinally exerted tensile stresses.

As it can best be seen from FIG. 5, the conveyor belt 62 moves along a frame 64 with supporting rollers 66 rotatably mounted in said frame. At a sufficient distance from the bonding or welding apparatus a severing means 68 is arranged above the conveyor belt 62 for cutting the longitudinal edges of the webs having cooled in the meantime and thus giving the predetermined width to the webs. This severing means 68 is provied with a bridge 70 extending across the conveyor belt 62, said bridge being mounted on the frame 64 by means not illustrated and being provided in the region of each of the two longitudinal edges of the webs with an edge- or wedge-shaped contacting shoe 74 arranged between the conveyor belt 62 and the webs and lifting the longitudinal marginal regions of the webs from the conveyor belt 62. Furthermore the severing means is provided at each side with a cutter disc 76 driven by an electric motor 72 for cutting the lifted longitudinal edge regions of the webs. Before they pass the cutter discs the webs are pressed by holding-down rollers 80 against the contacting shoes 74.

Behind the conveyor belt 62 the two webs bonded together can be rolled up to a roll 84.

In line with the invention the infra-red heaters 44 and 56 can be replaced by microwave heating apparatus, which are on principle suited as heat sources for melting-on the back-covering mass 16 and the coating mass 24, as far as chemical changes of these masses can be avoided.

FIG. 6 shows the final product, the same reference numerals as in FIGS. 1 and 2 having been used. As FIG. 6, however, shows clearly, the backing web 20 is provided at its surface with trough-like recesses 100, which are formed according to the invention, when applying the coating mass 24 on the textile core of the backing web 20, by permitting the material to flow at the margins of the burl-shaped cushioning regions slightly beyond the textile core (during the production downwardly). In keeping with the invention, only the marginal regions 102 of the recesses 100 protruding upwardly are bonded with the lawn web, so that the trough-like recesses 100 are substantially maintained and are thus in a position to retain water which has leaked out through the lawn web.

Especially preferred heat sources are the elongated radiator SATURN 250 and medium-wave modulus radiators of the firm Heraeus which are available in the market. Instead of heat sources extending across the entire width of the webs, it is of course also possible to use shorter heaters, and, for heating the funnel-shaped space 54, they are arranged in tandem, whereas, for preheating the two webs, heaters can be used which are arranged in tandem relative to the direction of passage of the webs, but in laterally staggered relation to each other.

I claim:

1. In a method for forming a water permeable floor covering from a water-permeable surface web and an underlying elastic backing web; said surface web comprising an upper pile surface secured on a carrier layer having openings for water penetration; said surface web also being partially coated on its underside with a thermoplastic material for bonding to such elastic backing web which is partially coated on a first area of its upper surface with a thermoplastic material; said backing web also having apertures defining a second area which is water permeable; said method comprising the steps of synchronously guiding the surface web underside and the backing web upper surface along predetermined paths of movement and in facing relation with a heat source; plasticizing at least a portion of the thermoplastic material disposed on the surface web underside and the backing web upper surface; urging the surface web underside and the backing web upper surface into mutual engagemwent whereby plasticized thermoplastic material of said backing web surface and said surface web underside fuse together and said surface covering web and said backing web are bonded together.

2. A method for forming a water permeable floor covering from a water permeable surface web having an upper pile surface and an underlying backing web, comprising the steps of applying a thermoplastic material to a portion only of the underside of said surface web; whereby water may penetrate an uncoated portion of said surface web underside; applying a thermoplastic material to the upper surface of such underlying, water permeable backing web whereby water may permeate through an uncoated portion of said backing web; synchronously guiding the surface web underside and the backing web upper surface along predetermined paths of movement and in facing relation with a heat source; plasticizing at least a portion of the thermoplastic material disposed on the surface web underside and the backing web upper surface; urging the surface web underside and the backing web upper surface into mutual engagement whereby plasticized thermoplastic material of said backing web surface and said surface web underside fuse together and said surface covering web and said backing web are bonded together.

3. The method of claim 1 or 2 in which said heat source comprises an infrared heater.

4. The method of claim 1 or 2 in which the underside of the surface web and the upper surface of the backing web are preheated before being brought together and the thermoplastic coatings thereon plasticized immediately before being placed together by directing heat generating radiation of at least one energy radiator into the funnel-shaped space formed by the bringing together of the webs.

5. The method according to claim 4 in which the emission of the energy radiator is focused by such manner that the focal point is in the bottom portion of the funnel-shaped space.

6. The method of claim 1 or 2 in which the webs bonded with each other are placed on a conveyor belt to cool subsequently to the web engagement.

7. The method of claim 6 in which the bonded webs are placed on said conveyor belt with the backing web in engagement with the conveyor belt.

8. The method of claim 6 in which the webs bonded with each other are cut after cooling to desired width.

9. The method of claim 1 or 2 in which an oblong energy radiator extends transversely to the longitudinal directions of the web movements and across the entire width of each web.

10. The method according to claim 1 or 2 in which said backing web has a thermoplastic upper surface having formed therein trough-like recesses, and in which substantially only the edges of the trough-like recesses are heat-sealed with the thermoplastic coating on the back of the surface web, and the trough-like recesses are thereby at least partially maintained.

* * * * *